US011116238B2

(12) United States Patent
Rodriguez et al.

(10) Patent No.: US 11,116,238 B2
(45) Date of Patent: Sep. 14, 2021

(54) METHOD FOR PREPARING A DELIVERY SYSTEM OF ONE OR MORE ACTIVE INGREDIENTS IN AN EDIBLE COMPOSITION

(71) Applicant: INTERCONTINENTAL GREAT BRANDS LLC, East Hanover, NJ (US)

(72) Inventors: Luis D. Rodriguez, East Hanover, NJ (US); Navroz Boghani, East Hanover, NJ (US); Bharat Jani, East Hanover, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 0 days.

(21) Appl. No.: 15/545,221

(22) PCT Filed: Jan. 29, 2016

(86) PCT No.: PCT/US2016/015525
§ 371 (c)(1),
(2) Date: Jul. 20, 2017

(87) PCT Pub. No.: WO2016/123430
PCT Pub. Date: Aug. 4, 2016

(65) Prior Publication Data
US 2017/0367369 A1    Dec. 28, 2017

Related U.S. Application Data

(60) Provisional application No. 62/109,478, filed on Jan. 29, 2015.

(51) Int. Cl.
*A23P 10/30* (2016.01)
*A23P 30/20* (2016.01)
(Continued)

(52) U.S. Cl.
CPC ............ *A23G 4/02* (2013.01); *A23G 3/0014* (2013.01); *A23G 3/0023* (2013.01);
(Continued)

(58) Field of Classification Search
None
See application file for complete search history.

(56) References Cited

U.S. PATENT DOCUMENTS 3,188,983 A     6/1965 Tomberg
4,978,537 A    12/1990 Song
(Continued)

FOREIGN PATENT DOCUMENTS

WO        9965324 A1    6/1998
WO        0025606        5/2000
(Continued)

OTHER PUBLICATIONS

Christian Gand, "Chewing Gum Manufacture," Chapter 10 from Formulation and Production of Chewing and Bubble Gum, Jan. 1, 2008 Kennedy's Books Ltd., XP055275780, pp. 253-275.
(Continued)

*Primary Examiner* — Viren A Thakur
*Assistant Examiner* — Thanh H Nguyen
(74) *Attorney, Agent, or Firm* — Cantor Colburn LLP (57) ABSTRACT

A method for preparing a first component of a comestible composition is provided including forming an extrudate of the first component. The extrudate is cooled to a first temperature. The extruder is further cooled to a second temperature. The first temperature is greater than the second temperature.

9 Claims, 4 Drawing Sheets

(51) Int. Cl.
*A23G 4/20* (2006.01)
*A23L 27/00* (2016.01)
*A23G 3/34* (2006.01)
*A23G 4/06* (2006.01)
*A23G 4/02* (2006.01)
*A23G 3/02* (2006.01)

(52) U.S. Cl.
CPC ......... *A23G 3/0226* (2013.01); *A23G 3/0247* (2013.01); *A23G 4/06* (2013.01); *A23G 4/20* (2013.01); *A23L 27/72* (2016.08); *A23P 10/30* (2016.08); *A23P 30/20* (2016.08); *A23V 2002/00* (2013.01)

(56) References Cited

U.S. PATENT DOCUMENTS

| | | | |
|---|---|---|---|
| 5,045,325 A | | 9/1991 | Lesko et al. |
| 5,846,580 A | * | 12/1998 | Franke ............. A23P 10/25 426/62 |
| 6,607,778 B2 | * | 8/2003 | Mutka ................ A61K 8/0283 426/103 |
| 7,351,438 B2 | | 4/2008 | Sozzi et al. |
| 2001/0038879 A1 | | 11/2001 | Mutka et al. |
| 2007/0224311 A1 | | 9/2007 | Grey et al. |
| 2011/0037185 A1 | | 2/2011 | Kowalski et al. |
| 2015/0004281 A1 | * | 1/2015 | Song ...................... A23G 4/20 426/5 |
| 2015/0098909 A1 | * | 4/2015 | Gao ................... A23G 3/0021 424/49 |

FOREIGN PATENT DOCUMENTS

| | | |
|---|---|---|
| WO | 2006122206 A2 | 11/2006 |
| WO | 2011026003 A2 | 3/2011 |

OTHER PUBLICATIONS

Invitation to Pay Additional Fees, dated Jun. 6, 2016, pp. 1-7.
PCT Notification of Transmittal of the International Search Report; International Application No. PCT/US2016/015525; International Filing Date: Jan. 29, 2016; dated Aug. 11, 2016; pp. 1-8.
PCT Written Opinion; International Application No. PCT/US2016/015525; International Filing Date: Jan. 29, 2016; dated Aug. 11, 2016; pp. 1-11.
PCT International Preliminary Report on Patentability; International Application No. PCT/US2016/015525; International Filing Date: Jan. 29, 2016, dated Aug. 1, 2017, pp. 1-12.
Office Action with Translation; Japanese Application No. 2017-535883; dated Jun. 25, 2018; 19 Pages.
Chinese Office Action; Internatonal Application No. 201680005633.9; International Filing Date: Jul. 12, 2017; dated Jan. 16, 2020; 16 pages.
Chinese Office Action; International Application No. 201680005633.9; International Filing Date: Jul. 12, 2017; dated Aug. 7, 2020; 13 pages.
European Office Action; International Application No. 16703704.3-1105; International Filing Date: Jul. 21, 2017; dated Oct. 12, 2020; 3 pages.

* cited by examiner

METHOD FOR PREPARING A DELIVERY SYSTEM OF ONE OR MORE ACTIVE INGREDIENTS IN AN EDIBLE COMPOSITION

CROSS REFERENCE TO RELATED APPLICATIONS

This application is a National Stage application of PCT/US2016/015525, filed Jan. 29, 2016, which claims the benefit of U.S. Provisional Application No. 62/109,478, filed Jan. 29, 2015, both of which are incorporated by reference in their entirety herein.

FIELD

The disclosure relates generally to a system and method for manufacturing comestible compositions, and more particularly, to a system and method for manufacturing a first component used as an ingredient of a comestible composition.

BACKGROUND

Conventional methods for preparing one or more active ingredients for use in a comestible include forming an extrudate having the active ingredients encapsulated therein. The extrudate is then convectively cooled to a temperature such that the extrudate may be broken into plurality of pieces before being ground into a powder. When the extrudate is broken, the pieces formed are non-uniform in shape and size. As a result, various amounts of energy are required to grind each piece into particles of a desired size, thereby making the milling operation inefficient.

Accordingly, a system and method capable of continuously and efficiently preparing an active ingredient for use in a comestible is desirable.

SUMMARY

According to one embodiment of the invention, a method for preparing a first component of a comestible composition is provided including forming an extrudate of the first component. The extrudate is cooled to a first temperature. The extruder is further cooled to a second temperature. The first temperature is greater than the second temperature.

According to another embodiment of the invention, a system for preparing a first component of a comestible composition is provided including an extruder for forming an extrudate of the first component. A transport device receives said extrudate output from the extruder and is configured to cool said extrudate to a first temperature. A pelletizer is positioned to receive said extrudate output from said transport device. The pelletizer is configured to cut said extrudate into a plurality of substantially identical pieces.

According to yet another embodiment of the invention, a method for preparing a first component of a comestible composition is provided including extruding an encapsulate composition. The encapsulate composition is cut into a plurality of substantially identical pieces.

According to another embodiment of the invention, a method for preparing a first component of a comestible composition is provided including extruding an encapsulate composition. The encapsulate composition is cooled to a first temperature above a glass transition temperature of the encapsulate composition.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

The following disclosure will detail particular embodiments according to the present invention, which provides methods and systems for manufacturing encapsulate compositions, particularly for use in chewing gum and other such confections.

The comestible included in the comestible extrudate, mass and sheet discussed herein include any type of edible product, such as but not limited to chewing gum (at any stage including elastomer, partially finished base, finished chewing gum base, and finished chewing gum), confection (which may be synonymous with chewing gum and candy), sweet and savory biscuits and cakes, nuts, and grains. For ease of description, the comestible will be referred as chewing gum for the remainder of the description. Certain compositions of chewing gum may have a non-uniform texture and/or a multi-layered composition.

As used herein, a product referred to as "chewing gum" or "gum" includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum.

Before explaining the various systems and methods according to the present invention, it is helpful to discuss the general composition of several typical stages of chewing gum manufacture in which encapsulate may be used, namely finished gum.

A "finished chewing gum" or "finished gum," as used herein, will refer to chewing gum that is generally ready for preparation to distribute the product to the consumer. As such, a finished gum may still require temperature conditioning, forming, shaping, packaging and coating. However, from a compositional standpoint, the chewing gum itself is generally finished. Not all finished gums have the same ingredients or the same amounts of individual ingredients. By varying the ingredients and amounts of ingredients, textures, flavor and sensations, among other things, can be varied to provide differing characteristics to meet the needs of users.

As is generally well known, a finished gum typically includes a water soluble bulk portion, a water insoluble gum base portion, and one or more flavoring agents. The water soluble portion dissipates over a period of time during chewing. The gum base portion is retained in the mouth throughout the chewing process. A finished gum is to be defined as a chewing gum that is ready for user consumption.

A "finished chewing gum base" or "finished gum base", as used herein, will refer to chewing gum that includes a sufficient combination of gum base ingredients that need only be combined with subsequent gum ingredients to form a finished gum. A finished gum base is a visco-elastic material that includes at least a viscous component, an elastic component, and a softener component. For example, a typical gum base may include elastomer, at least some of the filler, resin and/or plasticizer, polyvinyl acetate, and a softener (such as an oil, fat or wax). Merely compounded elastomer without the addition of any softener, for example, would not be a finished gum base because it would not be considered useable in a finished gum structure because of its difficulty, if not impossibility, to chew. In one embodiment, the viscosity of the finished gum base or the extrudate output from the extruder described further below is between about 75 pascal-seconds and about 140,000 pascal-seconds.

A "partial chewing gum base" or "partial gum base," as used herein, will refer to chewing gum that includes a gum base ingredient or combination of gum base ingredients that need be combined with further gum base ingredients and subsequent, non-base gum ingredients to form a finished gum. A partial gum base includes at least an elastic component, and will require addition of at least a viscous and/or softener component to form a finished gum base.

Chewing gum may include a vast number of ingredients in various categories. The systems and methods discussed below may be used to mix any and all known ingredients including, but not limited to, ingredients in the following ingredient categories: elastomers, bulking agents, elastomer plasticizers (which includes resins), elastomer solvents, plasticizers, fats, waxes, fillers, antioxidants, sweeteners (e.g. bulk sweeteners and high intensity sweeteners), syrups/fluids, flavors, sensates, potentiators, acids, emulsifiers, colors, and functional ingredients.

The insoluble gum base in its finished gum base form generally includes ingredients falling under the following categories: elastomers, elastomer plasticizers (resins or solvents), plasticizers, fats, oils, waxes, softeners and fillers. Further discussion of representative ingredients within each category will be provided later on. The gum base may constitute between 5-95% by weight of a finished gum, more typically 10-50% by weight of the finished gum, and most commonly 20-30% by weight of the finished gum.

The water soluble portion of finished gum will be referred to as subsequent ingredients in this disclosure (as they are added subsequent to manufacture of a) finished gum base, and may include subsequent gum ingredients falling under the following categories: softeners, bulk sweeteners, high intensity sweeteners, flavoring agents, acids, additional fillers, functional ingredients and combinations thereof. Softeners are added to the gum in order to optimize the chewability and mouth feel of the gum. The softeners, which are also known as plasticizers, plasticizing agents or emulsifiers, generally constitute between about 0.5-15% by weight of the finished gum. Bulk sweeteners constitute between 5-95% by weight of the finished gum, more typically 20-80% by weight of the finished gum and most commonly 30-60% by weight of the finished gum. High intensity sweeteners may also be present and are commonly used with sugarless sweeteners. When used, high intensity sweeteners typically constitute between 0.001-5% by weight of the finished gum, preferably between 0.01-3% by weight of the finished gum. Typically, high intensity sweeteners are at least 20 times sweeter than sucrose.

Flavor should generally be present in the gum in an amount within the range of about 0.1-15% by weight of the finished gum, preferably between about 0.2-5% by weight of the finished gum, most preferably between about 0.5-3% by weight of the finished gum. Natural and artificial flavoring agents may be used and combined in any sensorially acceptable fashion.

When included, acids typically constitute between about 0.001-5% by weight of the finished gum.

Optional ingredients such as colors, functional ingredients and additional flavoring agents may also be included in gum.

Figure 1:
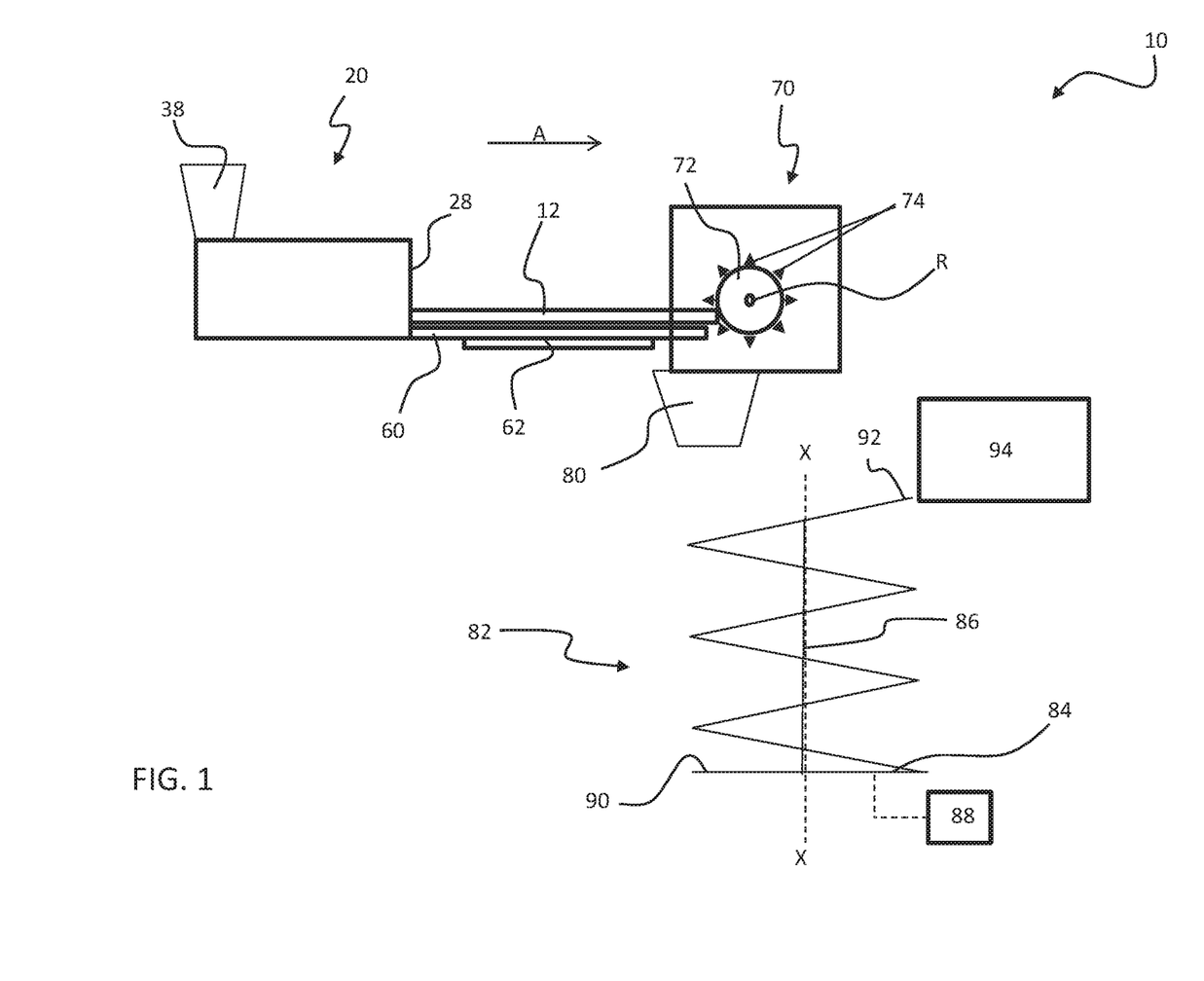
FIG. 1 is a schematic view of a system for preparing a first component of a comestible composition according to an embodiment of the invention.

With reference to FIG. 1, a system 10 for preparing a first component of a comestible composition, such as a chewing gum for example, includes an extruder 20 configured to output the first component as an extrudate 12. An example of an extruder 20 for use in the below discussed systems and methods is illustrated in more detail in FIG. 2. In the illustrated, non-limiting embodiment, the extruder 20 is a twin screw extruder including a substantially hollow barrel 22 within which a substantially identical first screw 24a and second screw 24b are mounted. However, other types of extruders, such as planetary roller extruders and single screw extruders for example, are within the scope of the invention.

Figure 2:
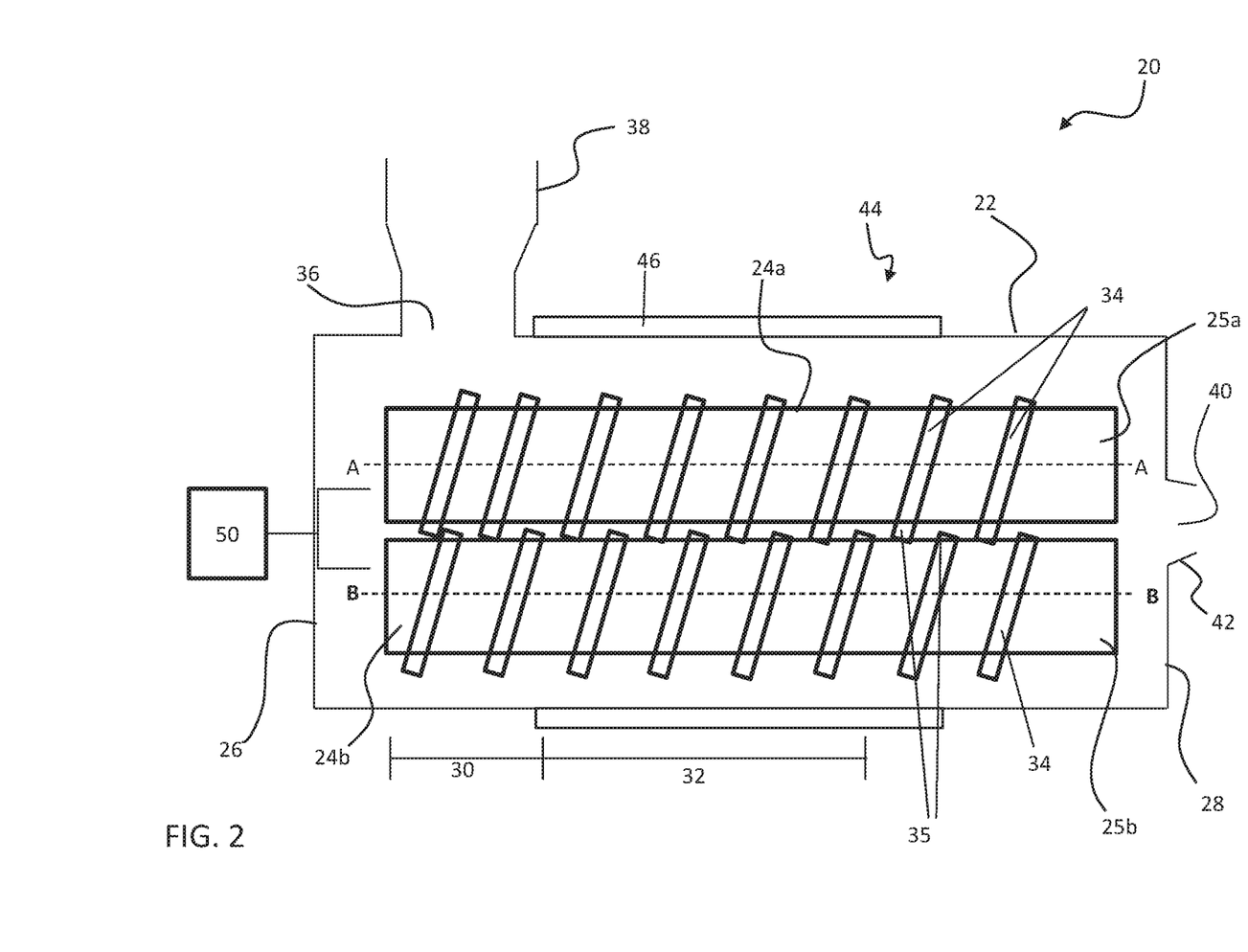
FIG. 2 is a cross-sectional view of an extruder configured for use in the system of FIG. 1 according to an embodiment of the invention.

In the twin screw extruder 20 shown in the FIG. 2, each of the first and second screws 24a, 24b generally extends from an inlet or feed end 26 to an outlet or extrusion end 28 of the barrel 22 and includes a central longitudinal axis A, B, respectively.

Referring now to the screws 24a, 24b in more detail, in one embodiment, a diameter of each screw 24a, 24b may remain constant over the length thereof. However, as different portions of the extruder 20 may include different functions, each screw 24a, 24b may have different diameters or configurations at different positions over the length of the extruder 20. For example, a first portion 30 of the screws 24a, 24b arranged near the feed end 26 of the extruder 20 may have a first diameter and a downstream, central portion 32 of the screws 24a, 24b may have a second, smaller diameter. The first portion 30 may be a feed portion and the central portion 32 may be configured to mix and melt the ingredients within the extruder barrel 22. The screws 24a, 24b include corresponding or intermeshing grooves or flights 34. These flights 34 assist in efficiently moving and mixing the first ingredient flowing through the extruder 20, with space 35 remaining for the first ingredient to flow between the flights 34 of the screws 24a, 24b. The flights 34 may have any desirable configuration, including but not limited to, a variance in the distance or gaps between adjacent flights, flight shape, and flight length for example.

The extruder 20 includes at least one point of entry 36 for ingredients entering the extruder 20, such as a point of entry located adjacent the feed end 26 or a point of entry located downstream from the feed end 26 of the barrel 22. The position of each of these points of entry 36 is selectable depending on the chosen application, the ingredient being added, and the form of the ingredient being added. Various types of feed inlets 38 may be used at the points of entry 36 to supply an ingredient to the inner volume of the extruder 20. In one embodiment, the feed inlet 38 is a gravity driven hopper/feeder. Alternatively, the feed inlet 38 may be a side feed inlet configured to provide a supply of an ingredient laterally to a side of the extruder 20.

An extrusion point 40 arranged at the outlet of extrusion end 28 of the barrel 22, includes the opening through which the first ingredient flowing through the extruder 20 will ultimately be extruded. It is notable that a downstream end 25 of the screws 24a, 24b are generally located in proximity to the extrusion point 40 of the extruder 20. Indeed, the downstream end 25 of the screws 24a, 24b may terminate such that the ends 25 thereof are flush with the extrusion point 40. As is known in the art, the extrusion point 40 is fluidly coupled to an extruder die 42 mounted at the extrusion end 28 of the barrel 22. The extruder die 42 is configured to extrude the first component in one or more desirable shapes, such as a rope or a continuous rectangular sheet for example.

In addition, the extruder 20 may include efficient temperature control for the first ingredient mixed therein and extruded therefrom. In one embodiment, the extruder 20 includes a temperature control system 44, such as but not limited to a cooling jacket and/or a heating jacket 46 positioned circumferentially about a portion of the barrel 22. The extruder 20 illustrated and described herein is intended as an example, and other known extruders 20, such as planetary roller extruders for example, are within the scope of the invention.

At least one motor 50 is operably coupled to the screws 24 of the extruder 20 and is configured to rotate the screws 24 about their respective longitudinal axes A, B. The screws 24 may be configured to co-rotate, or alternatively, may be configured to counter-rotate. Upon entry of the ingredients into the extruder 20, the rotation of the screws 24a, 24b, creates a directional flow of the ingredients towards the extrusion end 28 of the extruder 20. As the ingredients move away from the feed end 26 of the extruder 20, the rotating screws 24a, 24b mix the ingredients in the flow via movement of the flow through the spaces 35 defined between the teeth 34 of the rotating screws 24a, 24b. As the ingredients are conveyed and mixed, the ingredients form a first component. The mixed first component is then provided to the extrusion point 40 adjacent the downstream end 25 of the screws 24a, 24b. If an extruder die 42 is positioned adjacent the extrusion end 28 of the barrel 22, an extrudate 12 of the first component is expelled from the extruder 20 in a desired shape complementary to the extruder die 42. In one embodiment, the extrudate 12 is output from the extruder 20 as a rope or strand having a substantially constant cross-sectional area.

In one embodiment, the extrudate 12 of the first component provided at the extrusion point 40 of the extruder 20 is an encapsulate composition. An encapsulate composition typically includes an "active" ingredient and an encapsulating ingredient. In some embodiments, the active ingredient may be relatively sensitive to high energy mixing environments (such as heat and shearing forces that can be associated with some types of mixing). Any active ingredients typically used in a comestible, such as but not limited to high intensity sweeteners (including natural sweeteners and synthetic sweeteners), food acids, and miscellaneous ingredients (including texture modifiers, coloring agents, salts, oral care ingredients, and other ingredients), are contemplated for use with the extruder 20. Any encapsulating ingredients that may typically be used in comestible, such as but not limited to polymer or resin, are also contemplated for use with the extruder 20.

For example, active ingredients may include, but are not limited to sweeteners and food acids. Sweeteners used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include: (a) water-soluble sweetening agents such as dihydrochalcones, monellin, steviosides, glycyrrhizin, saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin and monatin; (b) dipeptide based sweeteners, such as L-aspartic acid derived sweeteners, such as L-aspartyl-L-phenylalanine methyl ester (Aspartame) and L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, neotame and advantame; (c) water-soluble sweeteners derived from naturally occurring water-soluble sweeteners, such as Reb-A, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxy.sucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalacto sucrose; 1',6'-dichloro 1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalacto sucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalacto sucrose; 6,1',6'-trichloro-6,1',6'-trideoxysucrose; 4,6-dichloro-4,6-dideoxy-alpha-D-galacto-pyranosyl-1,6-dichloro-1,6-dideox y-beta-D-fructofuranoside, or 4,6,1',6'-tetrachloro 4,6,1',6'-tetradeoxygalacto-sucrose; and 4,6,1',6'-tetradeoxy-sucrose, and mixtures thereof; or (d) Other protein based sweeteners such as thaumaoccous danielli (Thaumatin I and II) and talin. Food acids may include citric acid, malic acid, fumaric acid, tartaric acid, lactic acid and adipic acid.

Encapsulation of an active ingredient will result in the protection of the active ingredient from dissolution as a result of contact with water or saliva, thereby extending the relative life of the component within a finished gum product. In addition, encapsulation of an active ingredient may also result in the protection of the active ingredient during the remainder of the production process. As components of the comestible to be encapsulated may be sensitive to temperature, mixing, extruding, or other factors, the encapsulation allows for efficient handling and protection of these sensitive components during production. Protection of the active ingredient as referenced above is achieved via a mixing of the active ingredient(s) with an encapsulating ingredient(s). Indeed, an encapsulate composition as defined herein is an active ingredient(s), such as that discussed above, mixed for production or extrusion with an encapsulating ingredient(s) such as that discussed immediately below.

Examples of encapsulating materials/ingredients include polymers or resins, wherein the characteristics of the polymer or resin ingredient control the release profile and the protection of the active ingredient to be encapsulated. In some embodiments, the encapsulating material may be polyvinyl acetate, polyethylene, crosslinked polyvinyl pyrrolidone, polymethylmethacrylate, polylactidacid, polyhydroxyalkanoates, ethylcellulo se, polyvinyl acetatephthalate, polyethylene glycol esters, methacrylicacid-co-methylmethacrylate, polyvinylacetate-viynyl alcohol copolymer or any other ingredient suitable for polymer matrix type encapsulation.

As discussed above, it may be desirable to encapsulate certain ingredients or components used in comestibles, such as chewing gum. Encapsulate compositions as used herein include at least one active ingredient or component to be protected and released in a certain release profile, and at least one additional encapsulating ingredient such as, but not limited to a polymer or resin for example. After encapsulation, the encapsulate composition may be mixed with other gum ingredients, such as in a gum manufacturing system for example, to form a finished gum product.

During the encapsulation process, one or more active ingredients are provided to the extruder 20 from an active ingredient source and one or more encapsulating ingredients are added to the extruder 20 from an encapsulating ingredient source. Alternatively, the active and encapsulating ingredients may enter the extruder 20 from a common source at an active ingredient feed inlet 38 and an encapsulating ingredient feed inlet 38, respectively. In one embodiment, the active and encapsulating ingredients may be mixed before being supplied to the extruder 20 via a single inlet 38. The active ingredients and the encapsulating ingredients may be disposed at the same entry point 36 or at different entry points 36 of the extruder 20, thereby allowing for varying durations of mixing of the active and encapsulating ingredients. The active and encapsulating ingredients may be added in molten form or in pellet or raw ingredient form, such as but not limited to powder, liquid, or flake materials.

Referring again to FIG. 1, a transport device 60 arranged adjacent the outlet end 28 of the extruder 20 is configured to receive the extrudate 12 and supply it to a pelletizer 70 arranged downstream from and in line with the extruder 20. In addition, the transport device 60 is configured to partially cool the extrudate 12 prior to delivering the extrudate 12 to the pelletizer 70. In one embodiment, the transport device 60 is configured to cool the extrudate to a temperature above the glass transition temperature thereof, such as to a temperature between about 30° C. and about 90° C. for example. The transport device 60 may have a cooling system 62 coupled thereto such that the extrudate 12 is cooled via conduction. However, other methods of cooling the extrudate 12, such as blowing cool air over the extrudate 12 arranged on the transport device 60 for example, are within the scope of the invention.

Figure 3:
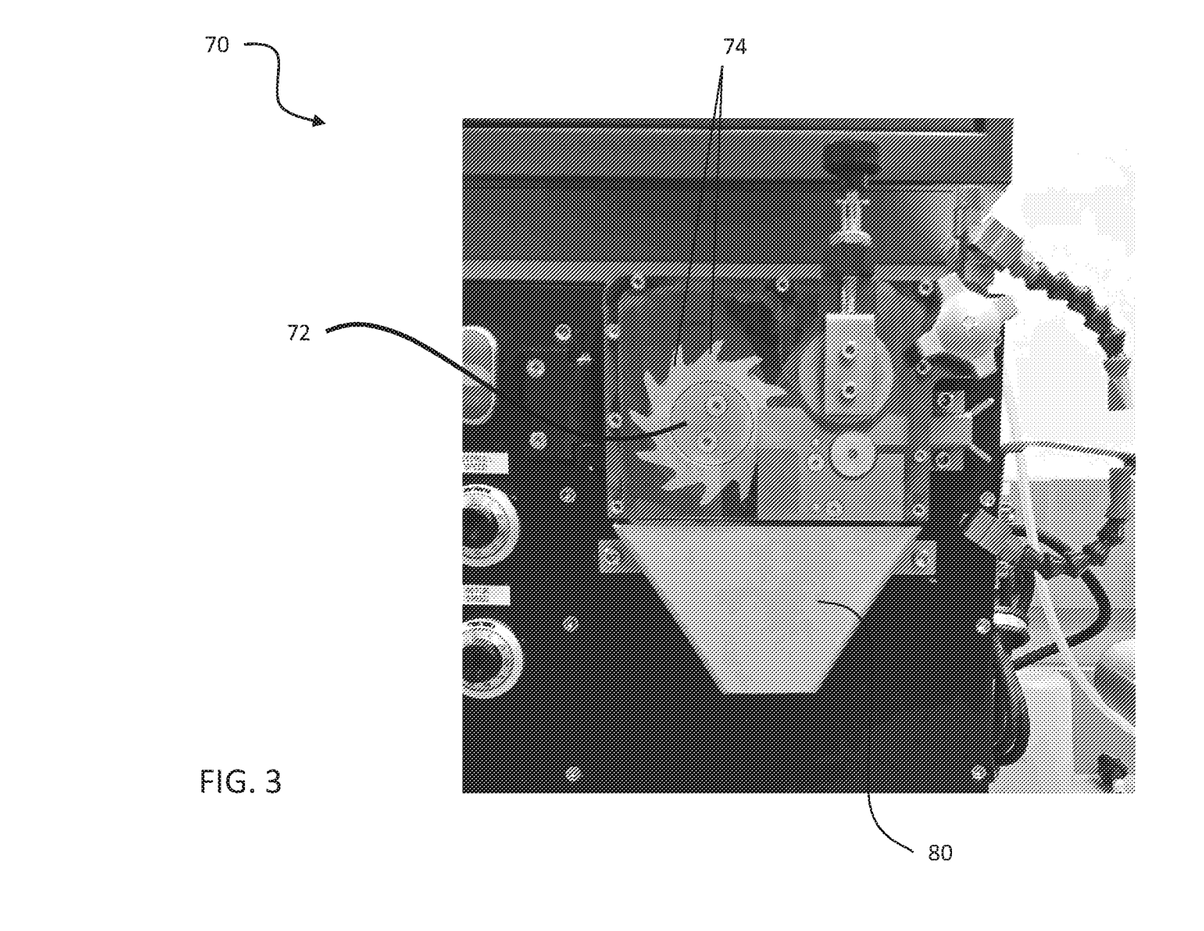
FIG. 3 is a front view of a pelletizer configured for use in the system of FIG. 1 according to an embodiment of the invention.

Referring now to FIG. 3, an example of the pelletizer 70 is illustrated in more detail. The pelletizer 70 includes a rotatable wheel 72 having a plurality of substantially identical teeth or blades 74 extending radially outwardly therefrom. An axis of rotation R of the wheel 72 is oriented generally perpendicular to a direction of travel of the extrudate 12, indicated by arrow A. As the extrudate 12 moves towards the rotating wheel 72 of the pelletizer 70, the teeth 74 continuously sever an adjacent end portion of the extrudate 12 to form a plurality of cut pieces of extrudate 14.

Figure 4:
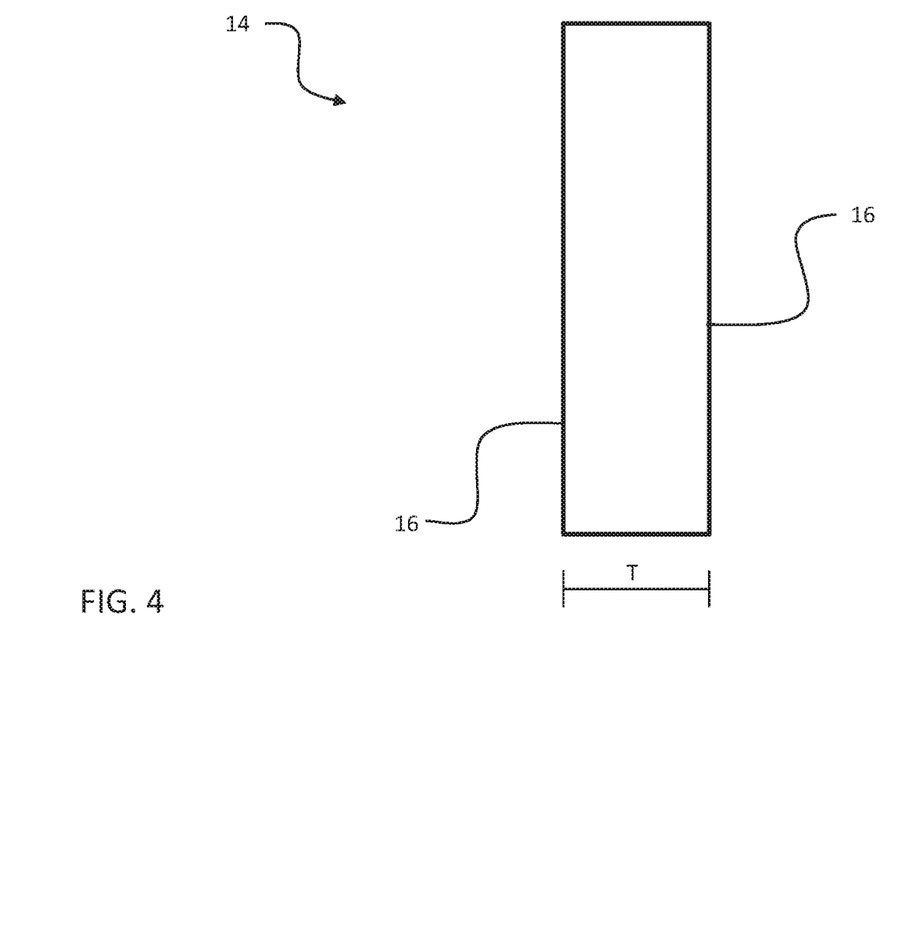
FIG. 4 is an example of a cut piece of extrudate according to an embodiment of the invention.

In one embodiment, the teeth 74 are spaced equidistantly about a circumference of the wheel 72 such that if the extrudate 12 moves towards the pelletizer 70 with a constant speed, each of the plurality of cut pieces 14 is substantially identical in size, particularly thickness, illustrated as T. An example of a cut piece 14 of the extrudate 12 is shown in more detail in FIG. 4. In one embodiment, the pelletizer 70 is configured such that the thickness of the formed pieces 14, measured parallel to the direction of travel A of the extrudate 12, is smaller than a diameter of a cut surface 16 of each cut piece 14. In one embodiment a ratio of the diameter of the cut surface 16 to the thickness of the piece 14 is greater than 1.

In conventional systems, the extrudate was cooled to a temperature below the glass transition temperature thereof, such as about 35° C. for example, prior to being broken into smaller pieces. At such temperatures, the extrudate is brittle resulting in a plurality of pieces having a variety of shapes and sizes. By only partially cooling the extrudate, such as to a temperature above the glass transition temperature as described in the present invention, the extrudate is malleable such that when it is cut, a plurality of even, substantially uniform pieces may be easily achieved.

In the illustrated, non-limiting embodiment, the pelletizer 70 additionally includes a funnel 80 arranged vertically below the interface between the extrudate 12 and the rotating wheel 72. The funnel 80 is configured to direct the cut pieces 14 of extrudate to an adjacent cooling mechanism 82 via gravity. Depending on the size of the cut pieces, the exterior surface, or alternatively, one of the cut surfaces 16 of each piece 14 will directly contact the cooling mechanism 82. In embodiments where the ratio of the thickness to the diameter of each piece 14 is limited, the cut pieces 14 are oriented such that one of the cut surfaces 16 of each piece 14 is in direct contact with a portion of the cooling mechanism 82, such as a conveying surface thereof.

The cooling mechanism 82 of the system 10 is configured to further cool the cut pieces 14 of extrudate prior to supplying the pieces 14 to a downstream processing machine 94. The example of a cooling mechanism 82 shown in FIG. 1 includes a spiral conveyor configured to receive the plurality of cut pieces 14 of extrudate supplied from the funnel 80. The spiral conveyor 82 includes a continuous conveying surface 84, which is optionally wound about a central axis X to create a vertical spiral path. The central axis X may include a tubular structure 86 configured to support the overall structure of the spiral conveyor 82. The conveying surface 84 may comprise any of a variety of shapes, including, but not limited to a helical design. Various sidewalls (not shown) may be attached to or extend from the edges of the conveying surface 84 to contain the plurality of cut pieces 14 of extrudate therein. The spiral design is advantageous in conserving operation space while increasing an overall length of the conveyor path since an element of the design includes a degree of vertical movement of the cut pieces 14.

In one embodiment, the spiral conveyor 82 produces vibratory motion to gently toss the plurality of cut pieces 14 forward, such as along the path defined by the conveying surface 84, without deforming the shape of the cut pieces 14. Vibratory forces, such as produced by a drive motor 88 coupled to the spiral conveyor 82 for example, may be transmitted to the conveying surface 84 in order to produce vibrations along the surface thereof. As the cut pieces 14 of extrudate are supplied to the conveyor 82, the vibratory forces are applied to the conveying surface 84 to translate movement of the cut pieces 14 along a path thereof. In one embodiment, the cut pieces 14 are delivered to an inlet 90 arranged at the bottom of the conveyor 82 such that the vibratory forces urge the cut pieces 14 to travel up the spiral path defined by the conveying surface 84. In another embodiment, the cut pieces 14 are supplied generally to a top of the spiral conveyor 82 such that the vibratory forces urge the cut pieces 14 of extrudate to travel down the spiral path of the conveying surface 84.

As the cut pieces 14 of extrudate travel along the conveying surface 84, the pieces 14 are further cooled, such as to a temperature below the glass transition temperature of the extrudate, for example between about 20° C. about 35° C. In one embodiment, a heat transfer medium, including but not limited to air, water, oil, refrigerant, and other gases and fluids for example, is supplied to at least a portion of the spiral conveyor 82. As a result of the direct contact between each cut piece 14, for example surface 16, and the conveying surface 84, heat is more efficiently conducted away from the cut pieces 14 in the spiral conveyor compared to conventional cooling mechanisms.

Referring again to FIG. 1, the processing machine 94 arranged downstream from and in line with an outlet 92 of the cooling mechanism 82 may include a milling machine. The milling machine 94 is configured to grind the plurality of cut pieces 14 of extrudate into a powder comprising particles of a desired size. The residence time of the pieces 14 within the milling machine 94 may be any suitable period of time necessary to achieve the desired particle size. From the milling machine 94, the ground first component 18 may then be provided to a mixing machine of a comestible manufacturing system, where the first component is used as an ingredient of a comestible composition as is known in the art.

The system 10 for preparing a first component of a comestible composition as described herein has an increased consistency and efficiency by supplying a plurality of substantially uniform cut pieces 14 of extrudate to the milling machine 94. In addition, by conductively cooling a surface 16 of each of the cut pieces 14 of the extrudate, the energy required to cool the pieces 14 of extrudate to a desired temperature prior to further processing is reduced.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for preparing a first component of a comestible chewing gum, wherein the first component is an encapsulate composition including an active ingredient, comprising:
   forming an extrudate of the first component via an extruder;
   transporting said extrudate extruded from said extruder to a downstream processing machine;
   actively cooling said extrudate from a temperature at an outlet of said extruder to a first temperature above a glass transition temperature of said first component, wherein said cooling said extrudate and said transporting said extrudate occur substantially simultaneously;
   cutting said extrudate cooled to said first temperature into a plurality of pieces substantially identical in shape; and
   further cooling said plurality of pieces to a second temperature, the first temperature being greater than the second temperature, wherein said second temperature is below said glass transition temperature of said first component.

2. The method according to claim 1, wherein the first temperature is between 30° C. and 90° C.

3. The method according to claim 1, wherein the second temperature is between 20° C. and 35° C.

4. The method according to claim 1, wherein each of said pieces includes a cut surface having a diameter larger than a thickness of the piece, and a ratio of the diameter of said cut surface to said thickness is greater than 1.

5. The method according to claim 1, further comprising:
   grinding said plurality of pieces into a powder having particles of a desired size.

6. A method for preparing a first component of a chewing gum, comprising:
   extruding an encapsulate composition including an active ingredient via an extrusion device;
   actively cooling said encapsulate composition extruded from said extrusion device;
   cutting said actively cooled encapsulate composition into a plurality of substantially identical pieces, wherein each piece includes a cut surface having a diameter larger than a thickness of the piece, and a ratio of the diameter of said cut surface to said thickness is greater than 1, wherein a temperature of said encapsulate composition during said actively cooled cutting is above a glass transition temperature of said encapsulate composition; and
   further cooling said plurality of pieces to a temperature below said glass transition temperature of said encapsulate composition.

7. The method according to claim 6, wherein the temperature of said encapsulate composition during said cutting is between 30° C. and 90° C.

8. The method according to claim 6, wherein said plurality of pieces are cooled to said temperature between 20° C. and 35° C.

9. The method according to claim 6, further comprising: grinding said plurality of pieces into a powder having particles of a desired size.

* * * * *